Patented Aug. 25, 1936

2,051,872

UNITED STATES PATENT OFFICE 2,051,872

TREATMENT OF MOTOR FUEL

Charles D. Lowry, Jr., Chicago, Ill., assignor to Universal Oil Products Company, Chicago, Ill., a corporation of Delaware No Drawing. Application April 30, 1934, Serial No. 723,181

7 Claims. (Cl. 44—9)

The invention relates more particularly to the treatment of motor fuel fractions produced in the cracking of petroleum.

In a more specific sense it is concerned with the use of small quantities of specific anti-oxidants or inhibitors to retard the deterioration in properties of cracked gasolines which are ordinarily suffered under average storage conditions prevailing in refineries. A further feature of the invention, which will be developed more in detail in the following specification, comprises the use of a material which indicates the partial or complete consumption of the inhibitor by a color change so that the extent of deterioration of the inhibited gasoline is readily determined at any period in its storage.

The art of using inhibitors to retard or substantially prevent deterioration in properties of cracked gasolines during their normal storage period prior to their sale is a relatively recent development in the petroleum refining art and the discovery of materials which are effective for this purpose has to a large extent eliminated the necessity for extensive chemical refining of petroleum distillates and at the same time conserved valuable material. In the older and more customary methods of treatment primary cracked naphthas are treated with sulfuric acid of commercial strength, the sludge separated, the distillate neutralized and subjected to a carefully run steam distillation to produce an endpoint gasoline. Sulfuric acid is not entirely selective in its action upon the more highly unsaturated olefins and sulfur compounds and tends to either dissolve or polymerize some mono olefins which are valuable as antiknock constituents when sufficient quantities of acid are used to effect a substantially sulfur reduction.

When raw or partly treated cracked gasolines are stored they frequently deteriorate in respect to color, gum content and antiknock value. The chemical reactions involved in these changes are evidently due to the polymerization of diolefins of a conjugated character to form gummy and resinous materials which ultimately precipitate and deposit in fuel feed lines and carburetors and on valve stems to seriously hinder the operation of internal combustion engines. The loss in antiknock value is probably both due to actual lessening of gasoline boiling range material and also to the presence of peroxides of olefins in solution in the gasoline, which accelerate the reactions of combustion in the engine cylinder.

To overcome the tendency of cracked gasolines to lose their valuable properties on storage a large number of special chemical compounds and semi-refined products have been tried.

In one specific embodiment the present invention comprises the use of approximately 0.002 to 2% of phenyl azocatechol as inhibitor, dye, and indicator in unstable gasolines.

The preferred inhibiting material, according to the concept of the present invention, is an oil soluble dye imparting a yellow to brown color to gasolines, depending upon the quantities used in solution. The following description is given of the manufacture of this compound to assist in developing its chemical structure and its properties.

The compound can be produced in small quantities by operating in aqueous solutions but in much larger quantities when alcohol is used as the solvent. Ordinarily an alcoholic solution of pyrocatechol is mixed with a very concentrated solution containing the calculated amount of benzene diazonium chloride and the mixed solution allowed to stand for some time, after which it is poured upon ice. The dye then separates as a granite red precipitate and is filtered and dissolved in a hot aqueous solution of ammonium acetate, in which operation some insoluble tar is left behind. The purified dye separates from the filtered solution on cooling and may be further purified if found necessary by repeating this step or crystallizing from alcohol.

The material prepared in the above described manner is sufficiently soluble in gasolines to give them a pleasing golden-yellow color for sales purposes and also substantially retard their deterioration under storage conditions. It may be added in amounts of from 0.01 to 2% more or less. It functions to arrest the oxidation reactions which ordinarily start the deterioration of cracked gasolines by preferentially absorbing oxygen and in so doing becomes gradually consumed and decolorized. However, tests both in the oxygen bomb and in storage have shown that when proper quantities are used there is very little loss in color for a considerable period, so that gasolines in which it is used show a uniform tint for the ordinary periods of storage encountered in the course of the distribution of motor fuel. The exhaustion of the inhibitor is first evidenced by a lightening of color which quickly goes through a light yellow stage and then disappears completely. The appearance of the light yellow color is an indication that more inhibitor is needed.

A test was run by first preparing a concentrate of the inhibitor in benzol and adding the concentrated solution to a gasoline in an amount corresponding to 0.01% by weight of the inhibitor referred to the gasoline. The induction period of the gasoline without inhibitor as determined in the standardized oxygen bomb test was 130 minutes which was increased to 730 minutes by the addition of the inhibitor. This figure is considerably in excess of the ordinarily required 240 minutes.

The novelty and utility of the process of the present invention are obvious from a consideration of the preceding specification and the single instance of numerical data showing practical results, but neither is to be considered as unduly limiting its scope.

I claim as my invention:

1. A process for the treatment of cracked hydrocarbon oil of substantially motor fuel boiling range to retard deterioration of the same in respect to gum formation and antiknock value, which comprises adding thereto a phenylazocatechol which imparts color to the hydrocarbon oil, the process being further characterized by loss in color of the hydrocarbon oil as deterioration progresses.

2. A process for the treatment of cracked hydrocarbon oil of substantially motor fuel boiling range to retard deterioration of the same in respect to gum formation and antiknock value, which comprises adding thereto a small amount of phenylazocatechol which imparts color to the hydrocarbon oil, the process being characterized by loss in color of the hydrocarbon oil as deterioration progresses.

3. A process for the treatment of cracked hydrocarbon oil of substantially motor fuel boiling range to retard deterioration of the same in respect to gum formation and antiknock value, which comprises adding thereto from 0.002 to 2 per cent of phenylazocatechol, which imparts color to the hydrocarbon oil, the process being further characterized by loss in color which it imparts to the hydrocarbon oil as deterioration progresses.

4. A cracked hydrocarbon oil of substantially motor fuel boiling range containing a relatively small amount of phenylazocatechol to retard deterioration of said oil in respect to gum formation and antiknock value.

5. A cracked hydrocarbon oil of substantially motor fuel boiling range containing from 0.002 to 2 percent of phenylazocatechol to retard deterioration of said oil in respect to gum formation and antiknock value.

6. A method of treating gasoline containing gum-forming constituents which comprises adding thereto a relatively small amount of phenylazocatechol.

7. Motor fuel comprising gasoline containing gum-forming constituents and a relatively small amount of phenylazocatechol.

CHARLES D. LOWRY, Jr.